(12) United States Patent
O'Leary (10) Patent No.: US 6,406,618 B1
(45) Date of Patent: Jun. 18, 2002

(54) PORTABLE FIRE SPRINKLER CHEMICAL FEED SYSTEM

(76) Inventor: Richard A. O'Leary, 35 Mountain View Dr., Port Jervis, NY (US) 12771

( * ) Notice: Subject to any disclaimer, the term of this patent is extended or adjusted under 35 U.S.C. 154(b) by 47 days.

(21) Appl. No.: 09/630,825

(22) Filed: Aug. 2, 2000

(51) Int. Cl.⁷ .................................................. C02F 1/00
(52) U.S. Cl. .................... 210/143; 210/198.1; 210/205; 210/236; 210/241; 169/16; 239/310
(58) Field of Search .............................. 210/143, 198.1, 210/205, 236, 241; 169/16; 239/310

(56) References Cited

U.S. PATENT DOCUMENTS

| 4,460,008 A | 7/1984 | O'Leary et al. |
|---|---|---|
| 4,464,315 A | 8/1984 | O'Leary |
| 4,648,043 A | 3/1987 | O'Leary |
| 4,659,459 A | 4/1987 | O'Leary et al. |
| 5,803,180 A | 9/1998 | Talley |
| 6,221,263 B1 * | 4/2001 | Pope et al. |

* cited by examiner

*Primary Examiner*—Betsey Morrison Hoey
(74) *Attorney, Agent, or Firm*—Caesar, Rivise, Bernstein, Cohen & Pokotilow, Ltd.

(57) ABSTRACT

A portable fire sprinkler chemical feed apparatus is provided that can be coupled between a fire sprinkler system and its corresponding make up water supply for automatically treating the water of the fire sprinkler system with chemicals by monitoring the water flow conductivity. Where the chemicals fed include a biocide and corrosion inhibitor, the apparatus keeps the chemicals isolated from each other until they reach a reacting chamber where the chemicals are thoroughly mixed and then delivered to the fire Sprinkler system.

23 Claims, 6 Drawing Sheets

| Flow Rate GPM | Seconds Filling 5 gal. | Inhibitor & Biocide ml/min FSP-I-205 | Min reqd/1000 gal. | Stroke Setting |
|---|---|---|---|---|
| 30 | 10.00 | 204.39 | 33.33 | 3.24 |
| 29 | 10.34 | 190.99 | 34.48 | 3.03 |
| 28 | 10.71 | 178.05 | 35.71 | 2.82 |
| 27 | 11.11 | 165.56 | 37.04 | 2.63 |
| 26 | 11.54 | 153.52 | 38.46 | 2.43 |
| 25 | 12.00 | 141.94 | 40.00 | 2.25 |
| 24 | 12.50 | 130.81 | 41.67 | 2.07 |
| 23 | 13.04 | 120.14 | 43.48 | 1.90 |
| 22 | 13.64 | 109.92 | 45.45 | 1.74 |
| 21 | 14.29 | 100.15 | 47.62 | 1.59 |
| 20 | 15.00 | 90.84 | 50.00 | 1.44 |
| 19 | 15.79 | 81.98 | 52.63 | 1.30 |
| 18 | 16.67 | 73.58 | 55.56 | 1.17 |
| 17 | 17.65 | 65.63 | 58.82 | 1.04 |
| 16 | 18.75 | 58.14 | 62.50 | 0.92 |
| 15 | 20.00 | 51.10 | 66.67 | 0.81 |
| 14 | 21.43 | 44.51 | 71.43 | 0.71 |
| 13 | 23.08 | 38.38 | 76.92 | 0.61 |
| 12 | 25.00 | 32.70 | 83.33 | 0.52 |
| 11 | 27.27 | 27.48 | 90.91 | 0.44 |
| 10 | 30.00 | 22.71 | 100.00 | 0.36 |
| 9 | 33.33 | 18.40 | 111.11 | 0.29 |
| 8 | 37.50 | 14.53 | 125.00 | 0.23 |
| 7 | 42.86 | 11.13 | 142.86 | 0.18 |
| 6 | 50.00 | 8.18 | 166.67 | 0.13 |
| 5 | 60.00 | 5.66 | 200.00 | 0.09 |

PORTABLE FIRE SPRINKLER CHEMICAL FEED SYSTEM

FIELD OF THE INVENTION

The invention pertains to fire extinguishing systems in buildings, and more particularly, to systems for treating the water in these fire extinguishing systems with chemicals.

BACKGROUND OF INVENTION

The treatment of water systems is known in the art, such as those disclosed in U.S. Pat. Nos. 4,460,008 (O'Leary et al.); 4,464,315 (O'Leary); 4,648,043 (O'Leary); 4,659,459 (O'Leary et al.).

However, with particular regard to the fire sprinkler industry, the latter has not considered the application of chemicals to treat the water within fire sprinkler systems because of complications in their design that makes normal treatment methods useless and ineffective. Recent failures of fire sprinkler systems due to corrosion and bacteria attack are showing up at an alarming rate causing damage and loss of life. These failures are causing product recalls and in some cases, systems are being turned off because of the high cost of replacement.

Figure 2:
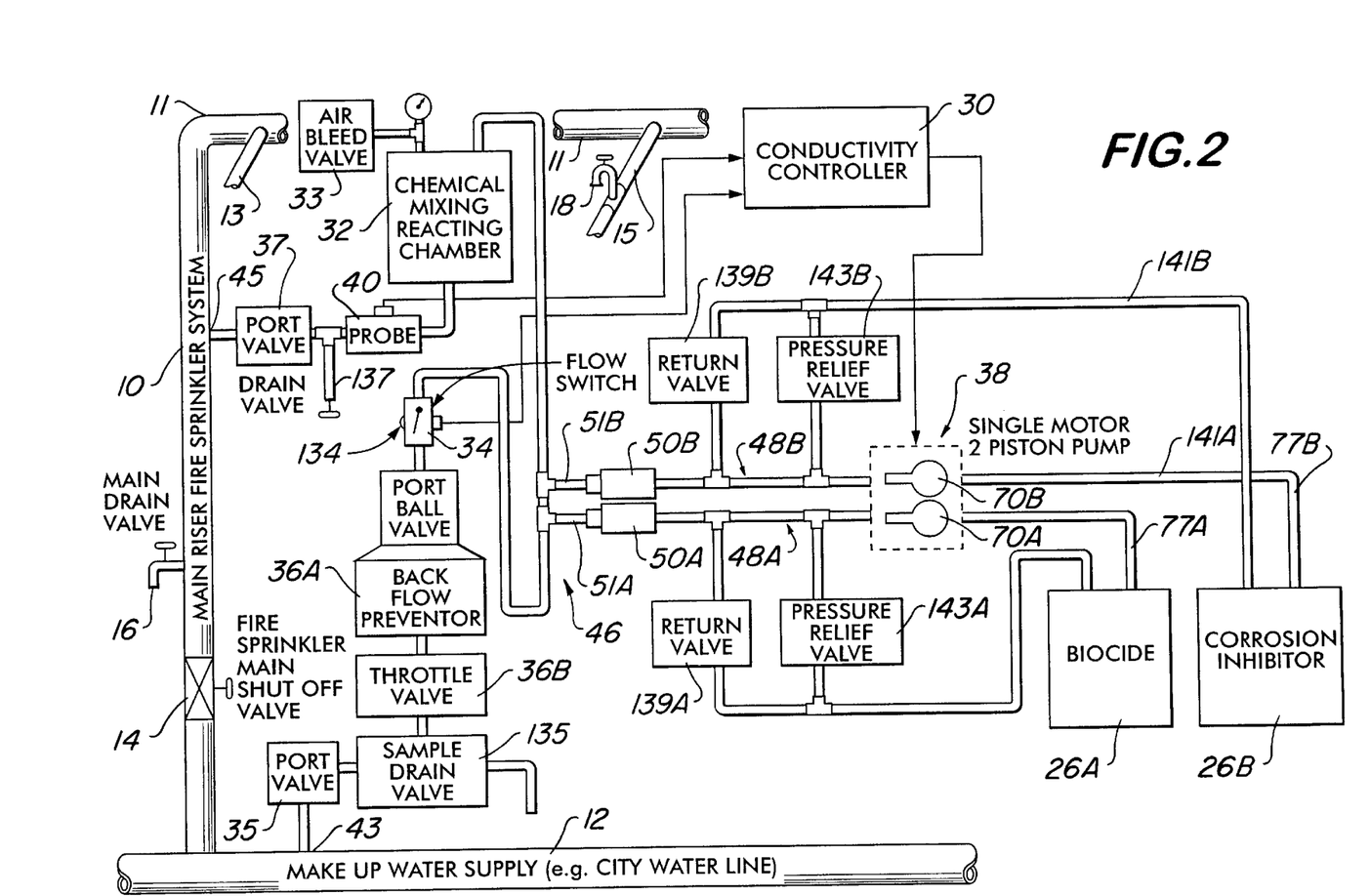
FIG. 2 is a block diagram of the portable fire extinguishing sprinkler chemical feed system shown coupled to a make up water supply and a fire sprinkler system.

The design of a fire sprinkler system consists of an upright pipe 10 (FIG. 2) called a riser that draws water from the city water pipe, tank, pond or river (see reference number 12 in FIG. 2). The risers 10 normally are 6 or 8 inch diameter pipe having a shutoff valve 14, main drain valve 16, flow alarm valve, and pressure detector. The purpose of the riser 10 is to carry water to the ceiling where it enters a header pipe 11 that carries water along the ceiling to lateral pipes 13, which come off the header pipe about every 10 to 20 feet. The lateral pipe has sprinkler heads attached to the top or bottom of the lateral about every 10 to 20 feet. The furthermost lateral pipe 15 has a 1" pipe extending down the wall and exiting through the wall to the outside, where water can be dumped for testing purposes. This line has a valve attached, which is known as the "Inspector's Test Valve" 18. The purpose of this valve 18 and line is to test the alarm valve on the riser 10, which should alarm when approximately 30 gallons of water are dumped causing flow and pressure drop. This test represents what would happen if one sprinkler was activated.

The piping design of fire sprinkler systems is unique and different from design parameters of all other water piping. The first sprinkler design is a "dead-ended" pipe system. That is, once the system is filled, the water will not be changed until a fire activates a sprinkler allowing flow to occur. As a result, fire sprinkler systems are considered "closed water systems." In fact, many of these systems include a back flow preventor such that once water is inputted into the sprinkler system, it cannot reverse.

Once or up to four times a year the inspector's valve is tested allowing only thirty gallons of water to flow. The average riser system contains 1500 to 2000 gallons of water. Most building have several riser systems each covering about 40,000 square feet apiece. This design allows corrosion to occur and not be detected. That is, almost the entire internal cross sectional area can be plugged with corrosion byproducts and still allow 30 gallons per minute to flow. Only when a fire occurs will the plugged pipe be detected. That is the system cannot allow sufficient water to flow to put out the fire. The corrosion byproducts can also plug the sprinkler heads causing failure.

One knowledgeable in the application of chemicals into water systems would easily see the futility of trying to feed and control chemicals in a 6 inch or 8 inch diameter riser pipe flowing at its rated capacity. A chemical feed pump does not exist that would handle this flow rate. As the dead-ended system starts filling, the pressure would start building and this would cause a reduction in flow. This would cause even greater chemical feed and control problems. Further complications will develop because of laminar flows within the pipes. These flow would not allow uniform mixing of chemicals within the pipe. Pipe design will not allow in-line mixers because of restricted water flows. Improper chemical concentrations would develop causing greater under deposit corrosion from precipitated chemicals. This same conditions would occur if one were to throttle the riser shut off valve 14. Adding to the complication of feeding and mixing is the compatibility of a chemical biocide with a corrosion inhibitor. These cannot be fed in a concentrated form together. They must be diluted in water first to prevent reactions and to be effective.

U.S. Pat. No. 5,803,180 (Talley) discloses a method whereby a buffering compound (e.g., sodium hydroxide) is injected into a fire sprinkler system water to maintain the pH of the water in a range of 9.5–11. The patent also suggests the use of a dielectric coupling at the sprinkler head/iron service tee connections of the fire sprinkler system.

In view of all of the above, there remains a need for a portable system and method of treating the water in a fire sprinkler system.

SUMMARY OF THE INVENTION

A fire sprinkler treatment apparatus is provided for automatically treating the water of a fire sprinkler system with at least one chemical (e.g., bromine, or biocide and corrosion inhibitor). The apparatus is adapted to be coupled between the fire sprinkler system and a water source (e.g., city water line, fire hydrant, ) that supplies the fire sprinkler system with water. The apparatus comprises a portable frame that permits the apparatus to be transported.

A method for automatically treating the water of a fire sprinkler system with at least one chemical (e.g., bromine, or biocide and corrosion inhibitor) is provided and wherein the fire sprinkler system comprises a main riser and a water source for supplying water to the fire sprinkler system. The method comprises the steps of: (a) isolating the main riser from the water source and emptying the main riser of the existing water therein; (b) providing a supply of the at least one chemical; (c) determining a conductivity setpoint at which the at least one chemical is effective; (d) coupling a delivery means of the at least one chemical between the main riser of the fire sprinkler system and the water source so that a flow of water is created from the water supply to the main riser; (e) delivering-the at least one chemical from the supply to the flow of water towards a mixing chamber where the at least one chemical is mixed; (f) monitoring the conductivity of the water flow out of the mixing chamber that is delivered to the main riser; (g) comparing the monitored conductivity with the setpoint; (h) repeating steps e-g as long as the monitored conductivity is less than the setpoint.

DESCRIPTION OF THE DRAWINGS

Many of the attendant advantages of this invention will be readily appreciated as the same becomes better understood by reference to the following detailed description when considered in connection with the accompanying drawings wherein.

DETAILED DESCRIPTION OF THE PREFERRED EMBODIMENT

Figure 1:
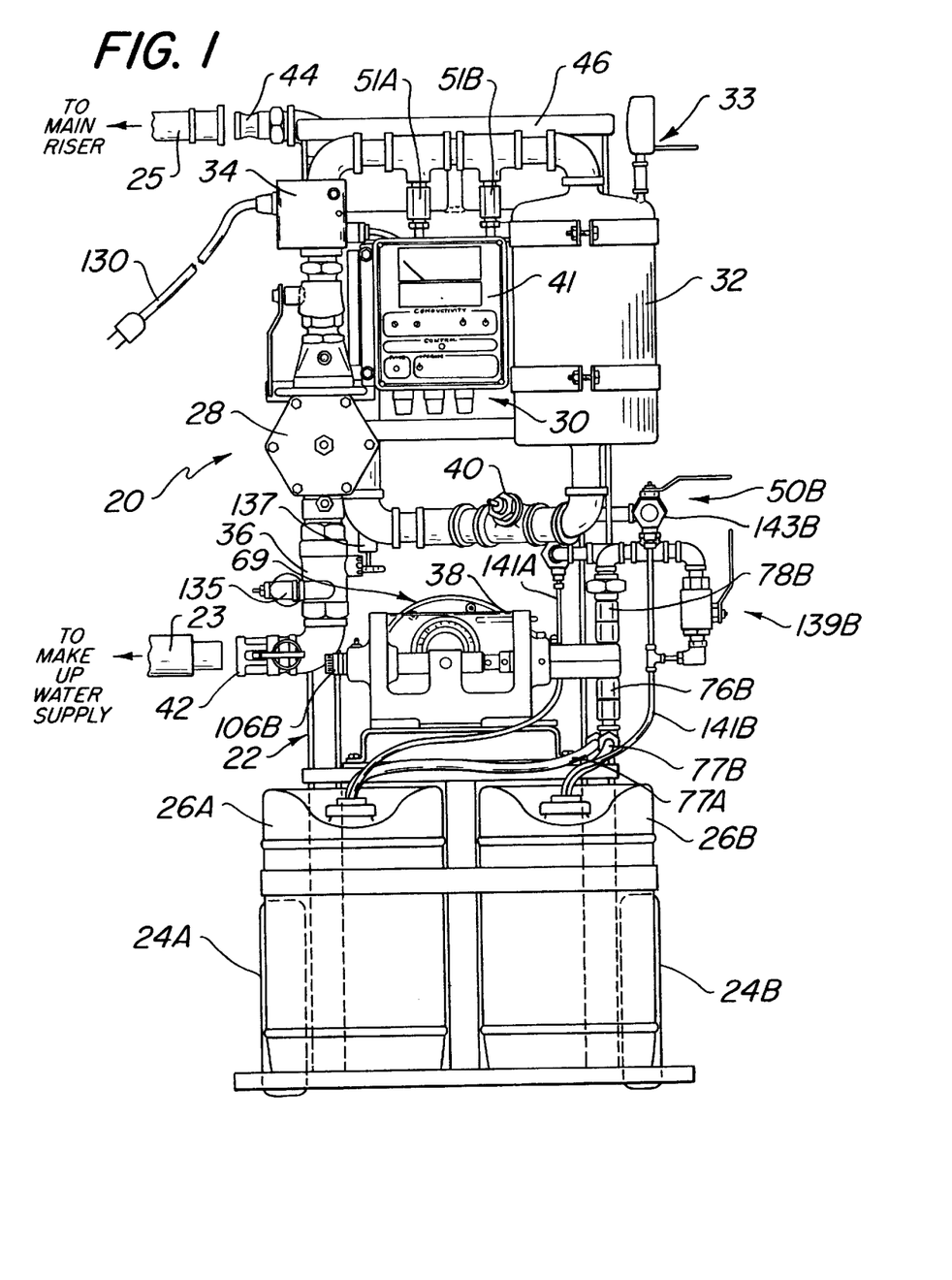
FIG. 1 is a front view of the portable fire extinguishing sprinkler chemical feed system.

Referring now in detail to the various figures of the drawing wherein like reference characters refer to like parts, there is shown at 20 in FIG. 1, an apparatus for automatically treating the water in a fire extinguishing system using chemicals.

As shown in FIG. 1, the apparatus 20 comprises a portable frame 22 that supports substantially all of the components of the apparatus 20 thereon. A pair of wheels 24A/24B permit the apparatus 20 to be easily transported to almost any fire extinguishing system.

On the portable rack 22, there is supported a first container 26A and a second container 26B (e.g., a 6-gallon capacity) for storing a biocide and corrosion inhibitor, respectively, used for treating the water of the fire extinguishing system of a building or other facility. A conductivity controller 30, a chemical mixing reacting chamber 32, a flow switch 34, a back flow preventor 28/throttle valve 36, a single motor/dual piston pump 38 and a probe 40 are all interconnected through a plurality of valves, manifolds, tubing, which are discussed below. The biocide chemical and the corrosion inhibitor chemical are not compatible and must be separated at all times until they are mixed in the reacting chamber 32.

FIG. 2 provides a block diagram of the apparatus 20 showing how it is coupled to the main riser 10 of a fire sprinkler system and to the make up water supply 12 for that fire sprinkler system. In general, before the apparatus 20 is even coupled to the fire sprinkler system's main riser 10, the sprinkler system is first isolated from the make up water supply 12 by closing the main shutoff valve 14. The water in the fire sprinkler system is then drained out by opening the main drain valve 15 and the inspector's port 18; once drained the main drain valve 15/inspector's port 18 are closed. The apparatus 20 is then prepared for operation by the operator inputting the conductivity and setpoint (as will be discussed in detail later) into the conductivity controller 30 and then priming the pump 38. Next, the operator connects an inlet hose 23 (FIG. 1) between an apparatus inlet fitting 42 (FIG. 1) and the water supply port 43 (FIG. 2) on the make up water supply line 12. Similarly, the operator connects an outlet hose 25 (FIG. 1) between an apparatus outlet fitting 44 and the main riser port 45 (FIG. 2) on the main riser 10. The operator then opens a port valve 35 at the make up water supply port 43, another port valve 37 at the main riser port 45 and an air bleed valve 33 to remove any trapped air in the apparatus 20 and then closes the valve 33. Because the main shutoff valve 14 is closed and because the make up water supply 12 is under pressure (e.g., 90–175 psi), when the make up water supply port valve 35 is opened by the operator, pressurized water flow enters the apparatus 20 from the make up water supply 12 and passes through the flow switch 34 which electrically energizes the conductivity controller 30 which in turn activates the pump 38 based on the detected water flow conductivity. The high pressure water flow passes through a manifold 46 that feeds into the chemical mixing reacting chamber 32. Also coupled to the manifold 46 are respective chemical feed paths 48A and 48B (FIG. 2) which include respective pistons 70A/70B (FIG. 2) that are driven by a single motor 69 (FIG. 1) and system feed valves 50A and 50B, along with injectors 51A/51B. As will be discussed in detail below, the pistons 70A/70B (FIG. 2) dispense a predetermined amount of chemical into the high pressure water flow in the manifold 46 (FIG. 2) when they are energized by the conductivity controller 30; furthermore, these pistons 70A/70B, operate in alternation to ensure that only one of the two chemicals (biocide or corrosion inhibitor) is being delivered into the manifold 46 at any time. The high pressure water flow through the manifold 46 assists the respective pistons 70A/70B in delivering the respective chemical feeds through the respective system check feed valves 50A/50B. The predetermined amounts of chemical are thoroughly mixed in the reacting chamber 32. This chemically-treated high pressure water flow then flows out of the chamber 32 past the conductivity probe 40, which transmits a conductivity value to the conductivity controller 30, and is delivered into the main riser 10 through the outlet hose and outlet port 45. If the conductivity value detected by the probe 40 is below the setpoint entered into the controller 30, the controller 30 energizes the motor 69 (FIG. 1) of the single motor/dual piston pump 38. Once the conductivity value reaches the setpoint, the controller 30 de-energizes the motor 69 of the single motor/dual piston pump 38.

Because the fire sprinkler system is a limited volume system, the high pressure water flow continues through the apparatus 20 until the fire sprinkler system is filled. Once filled, the high pressure water flow stops and the flow switch 34 opens, thereby deactivating the conductivity controller 30. The operator then closes the make up water supply port valve 35 and the main riser port valve 37; he/she then needs to open several valves on the apparatus 20 to release any water pressure before de-coupling the apparatus 20 from the fire sprinkler system and the make up water supply 12. Once the apparatus is de-coupled, the main shutoff valve 14 is re-opened and the treated fire sprinkler system is ready for operation.

As mentioned previously, the conductivity controller 30 (e.g., the HUG-1 conductivity controller manufactured by Advantage Controls, Inc. of Muskogee, Okla.) energizes and de-energizes the single motor/dual piston pump 38 (FIG. 2) based on the conductivity value detected by the conductivity probe 40. Although not shown, the controller 30 comprises a relay that closes whenever the detected conductivity value is below the setpoint, thereby providing electrical power to the motor 69 of the pump 38. Conversely, when the detected conductivity value is at or exceeds the setpoint, the relay opens, thereby shutting off power to the motor 69 of the single motor/dual piston pump 38.

Because the ability of water solution to conduct electricity is directly related to the level of total dissolved solids (TSD) in the solution, knowing the electrical conductance of a given water allows the controller 30 operator to approximate the TDS level. As electrolytes (e.g., salts, etc.) are added to the water, the electrical conductivity increases. This can be measured using a conductivity meter and is measured in units "siemens/cm." As also mentioned earlier, in preparing the apparatus 20, the operator must input the conductivity and setpoint. In particular, the operator must first determine the conductivity of the make up water supply 12. The conductivity value of any make up water supply varies from one supply to the next (e.g., 500 or 800 $\mu$siemens/cm). A hand-held device, e.g., the Pocket Pal™ can be used by the operator to determine the make up water supply conductivity.

Once this value is known, the operator loads this value into the apparatus 20 via a front panel 41 (FIG. 3) of the conductivity controller 30, as will be discussed below. In addition, on the chemical containers 26A/26B (or with literature provided with the containers), there is provided an operational range of the chemicals that sets forth the range of conductivity (e.g., 800–1400 $\mu$siemens/cm) over which these chemicals perform the best. The upper end value (e.g., 1400 $\mu$siemens/cm) of this range is used as the setpoint of the controller 30. Thus, during operation, when the apparatus 20 is coupled to the fire sprinkler system and the make up water supply 12 and there is flow through the apparatus 20, the single motor/dual piston pump 38 is delivering the appropriate chemical mixture to the flow and the conductivity rises. Once the conductivity probe 40 detects the setpoint is achieved, the controller relay is de-energized and the pump 38 is shutoff. Normally, this occurs when the fire sprinkler system is almost filled, the flow begins to slow down as the pressure rises high. During this period, the conductivity value detected by the probe 40 may fall slightly below the setpoint at which time the controller 30 re-energizes the pump 38 and the chemical feed begins again until the setpoint conductivity value is again detected by the probe. Thus, during normal operation, the pump 38 (FIG. 2) is active once the flow begins and remains on until the setpoint is achieved. Once the flow slows down and the pressure builds, the pump 38 is turned on/off for a very short time at the end of the fill as the conductivity value detected by the probe 40 oscillates slightly until the flow stops.

Figure 3:
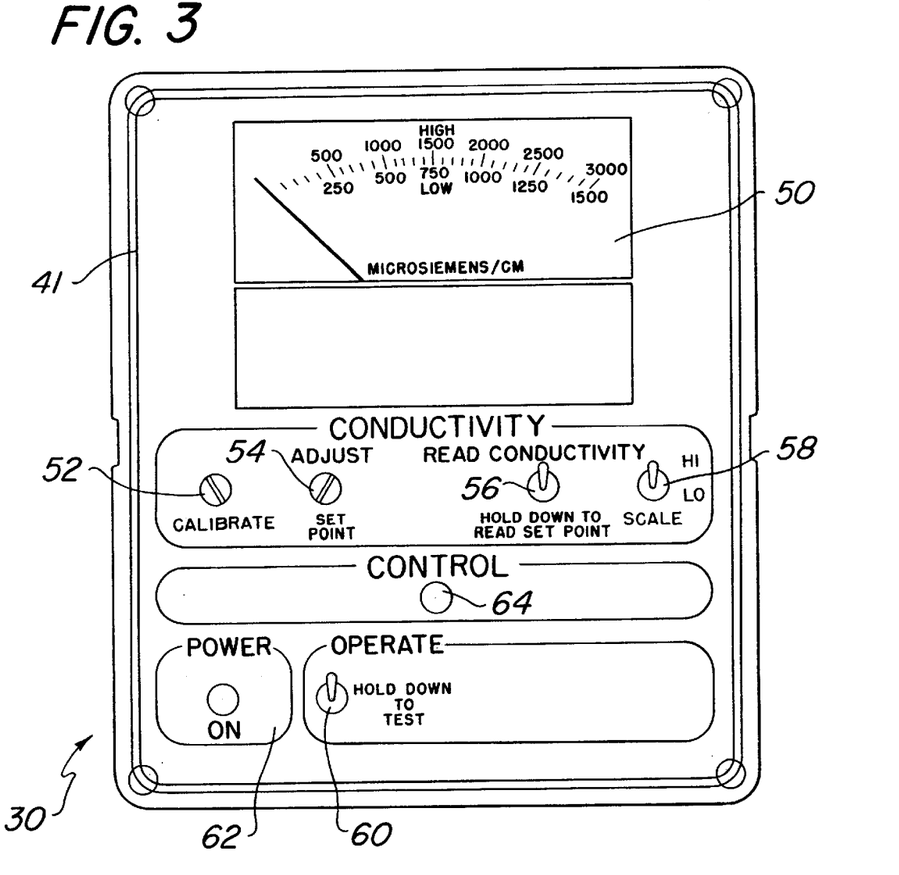
FIG. 3 is a view of the control panel for conductivity controller.

FIG. 3 depicts the front panel 41 of the conductivity controller 30. The setpoint and conductivity reading are displayed on the dual range (HIGH and LOW) analog front panel meter 50. Each time the probe 40 detects that the chemically-treated high pressure water flow out of the chamber 32 drops below the setpoint, the control relay (not shown) in the controller 30 energizes, which energizes the pump 38 to deliver the appropriate combination of chemicals. Once the conductivity of the output flow rises above the setpoint, the control relay de-energizes.

In particular, the panel 41 includes the meter 50, a calibration adjustment screw 52, a setpoint adjustment screw 54, a hold-down to read setpoint switch 56, a HI/LO switch 58 and a hold-down to test switch 60. During normal operation, the hold-down to read setpoint switch 56 is in the up position for reading conductivity; when switched into the down position, the point at which the pump 38 is activated is displayed (see LED 62, discussed below). When the operator wants to input the conductivity value of the make up water supply 12 into controller 30, he/she adjusts the calibration adjustment screw 52 accordingly. The calibrate adjustment screw 52 is a potentiometer that can be adjusted to the desired conductivity. Similarly, when the operator wants to input the setpoint into the controller 30, he/she holds the hold-down to read setpoint switch 56 and then adjusts the setpoint adjustment screw 54 accordingly. The setpoint adjustment screw 54 is also a potentiometer that can be adjusted to the desired setpoint. The HI/LO scale switch 58 permits the operator to select the low (0–1500 $\mu$siemens/cm) scale or the high (0–3000 $\mu$siemens/cm) scale. A power on LED 62 is provided to illuminate whenever power is supplied to the controller 30 via the flow switch 34. A control LED 64 is also provided to illuminate whenever the detected conductivity value is less than the setpoint.

As mentioned earlier, the controller 30 operates to activate the pump 38 in alternation to avoid mixing the two chemicals. The main objective is that the two chemical feed lines 48A and 48B remain independent to avoid mixing the two chemicals before they reach the mixing chamber 32. Thus, the pump 38 can be implemented by using two dedicated and independent pumps. Alternatively, the pump 38 can be implemented using a single motor/ two piston configuration to isolate the two chemicals from each other, i.e., the only time the two chemicals meet is in the mixing chamber 32.

Figure 4:
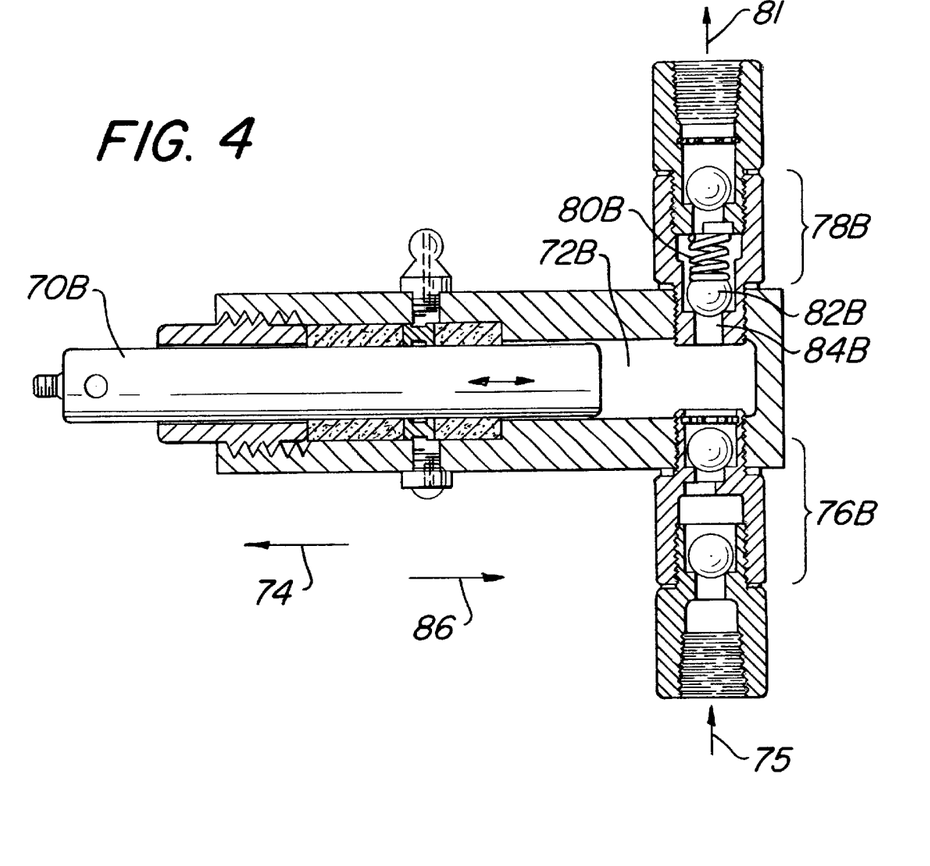
FIG. 4 is a partial cross-sectional view of one of the pistons of the single motor/dual piston pump.

In particular, the pump 38 (e.g., the AV5m piston pump also supplied by Advantage Controls, Inc.) utilizes the single motor 69 (FIG. 1) and two pistons 70A/70B, one of which (70B, for example; it being understood that a similar structure exists for the other piston 70A) is shown in partial cross-section in FIG. 4. The piston 70B reciprocates inside a cylinder 72B. When the piston 70B is driven to the left as shown by arrow 74, a predetermined amount of respective chemical is sucked from the container 26B via a suction line 77B (FIGS. 1 and 2; suction line 77A for the other piston 70A is also shown in those figures) and upward (see arrow 75) through a inlet port 76B and into the cylinder 72B. During this stage, an output valve 78B remains closed since a spring 80B holds a ball valve 82B closed over an opening 84B to the outlet valve 78B. When the piston is then driven in the opposite direction (see arrow 86), the force generated by the piston 70A is sufficient to overcome the biasing force of the spring 80B and to send the predetermined amount of chemical into the chemical feed line 48B, in the direction shown by the arrow 81.

Figure 5:
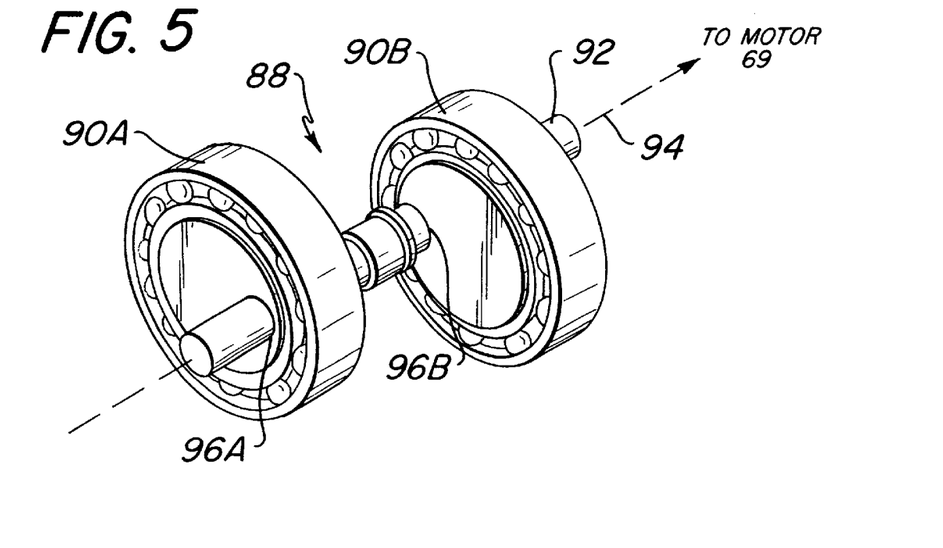
FIG. 5 is an isometric view of the respective bearings that drive respective pistons of the single motor/dual piston pump.
Figure 6:
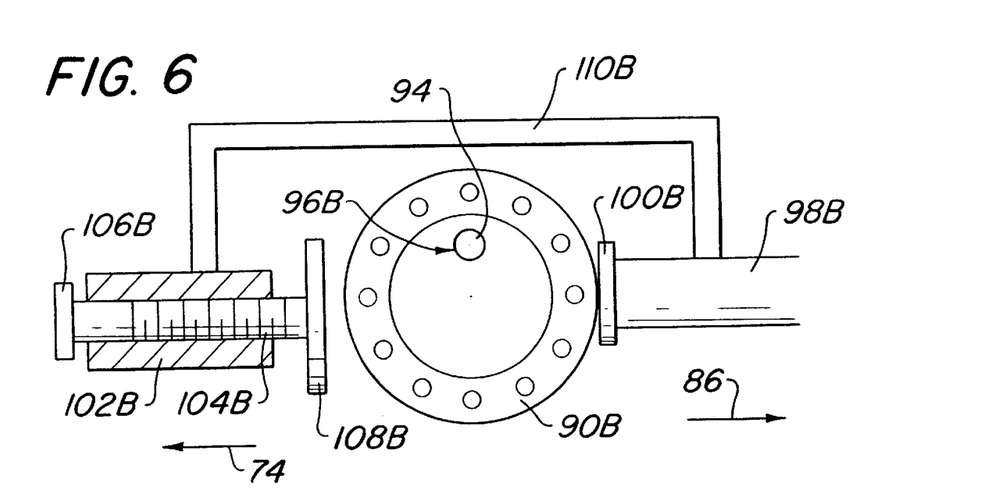
FIG. 6 is a partial functional diagram of a bracket that is adjustable for modifying piston stroke of the single motor/dual piston pump.

The driving mechanism 88 for the pistons is shown in FIGS. 5 and 6. A pair of bearings 90A and 90B are coupled together using a common shaft 92 but wherein the shaft's axis of rotation 94 is offset from each of the bearing's 90A/90B centers. As a result, when the motor 69 causes the shaft 92 to rotate, these bearings rotate in an eccentric motion. Furthermore, a respective rotation point of each bearing surface 96A and 96B is designed to cause eccentric motion of each bearing to be 180° out of phase with each other.

The eccentric motion of each bearing 90A/90B is converted to reciprocating linear motion for a respective piston using a bracket, as shown in FIG. 6, for one of the pistons 70B, it being understood that a similar structure is used for the other piston 70A. In particular, the piston 70B is contained within a piston housing 98B that includes a contact surface 100B both of which are located on one side of the bearing (e.g., 90B). On the other side of the bearing 90B is a slidable member 102B that comprises a threaded sleeve 104B for receiving a threaded member 106B having its own contact surface 108B. Both the sliding member 102 and the piston housing 98 are fixedly coupled to each other via a bracket 110B. Reciprocating motion of the piston 70B is as follows: As the bearing 90B rotates in a clockwise motion, the contact surface 100B is driven to the right (arrow 86) causing the piston 70B to move to the right; this motion drives the bracket 110B to the right along with the slidable member 102B to deliver the metered stream of chemical to the manifold 46. As the bearing 90B continues to rotate, the bearing 90B disengages from the contact surface 100B and engages the contact surface 108B causing the slidable member 102B to move to the left (arrow 74); this motion drives the bracket 110B to the left along with the piston housing 98B. Hence, the reciprocating motion. The other piston 70A is reciprocating 180° out of phase with this piston due to the opposite eccentric motion discussed previously.

Figure 7:
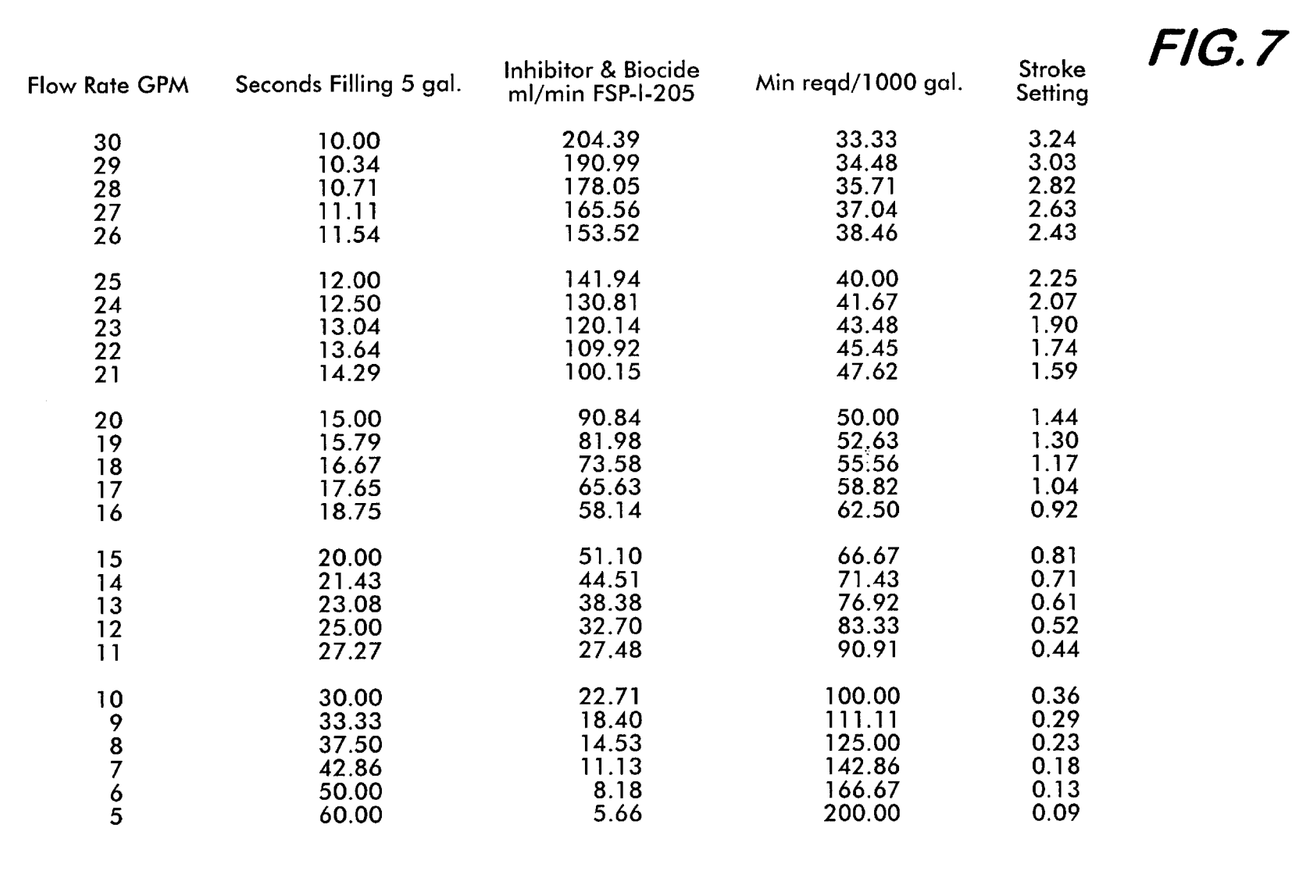
FIG. 7 is an exemplary set-up chart for setting the single motor/dual piston pump to deliver the proper amount of respective chemical.

The threaded member 106B allows the operator to adjust the length of piston stroke which in turn adjusts the amount of chemical sucked into the cylinder 72B. Thus, the operator has the ability to regulate the amount of chemical delivered by each piston. FIG. 7 provides an exemplary set up chart for adjusting the piston stroke in order to deliver the proper amount of chemicals to the fire sprinkler system. For example, the operator first determines the time (in seconds) it takes to fill a 5 gallon pail. Then, by using that time on the set up chart, the operator can determine the pump stroke setting, time (in minutes) to fill a 1000 gallon system, the ml/minute of chemical required and the flow rate (gpm) through the system.

Figure 8:
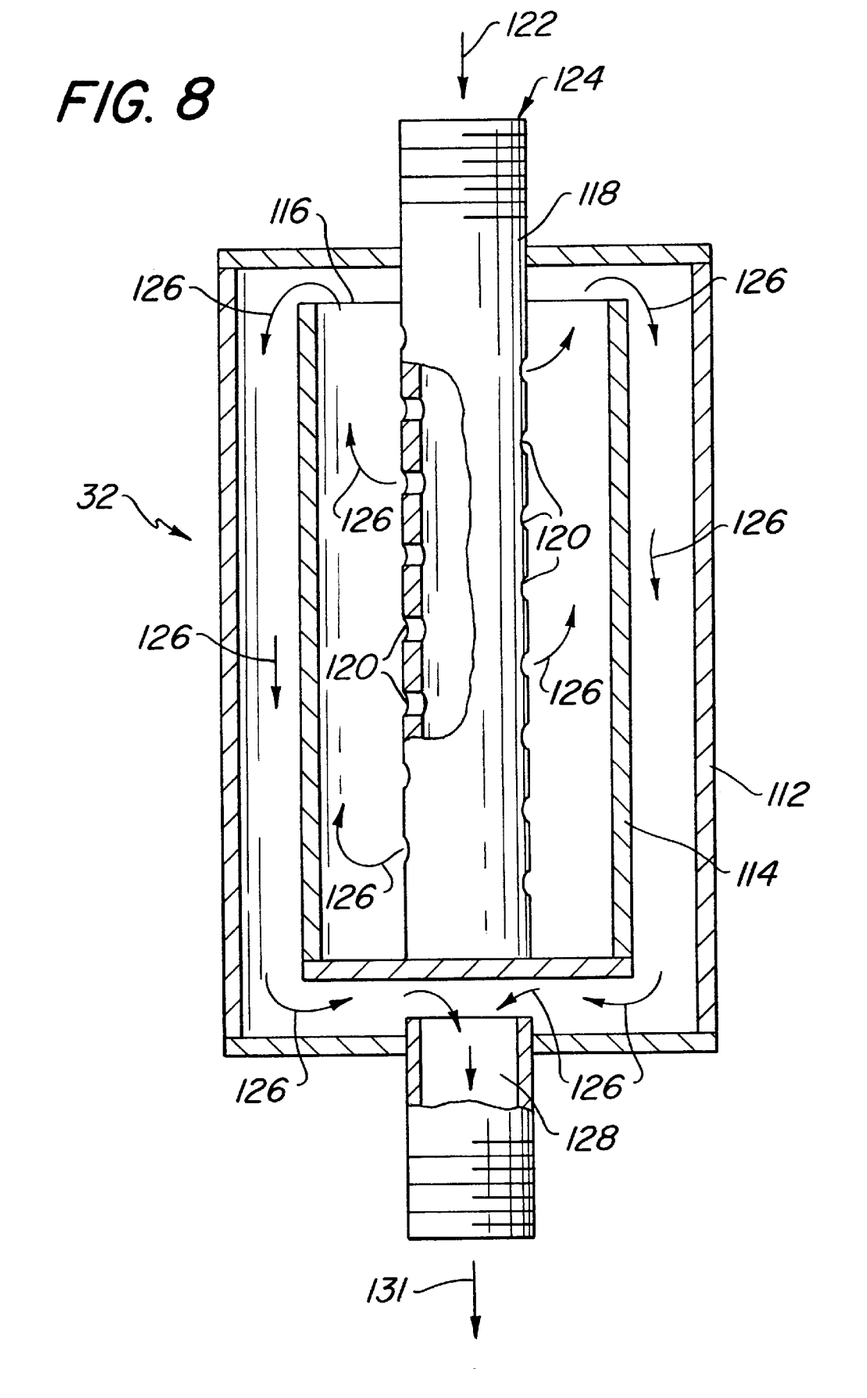
FIG. 8 is a cross-sectional view of the chemical mixing reacting chamber.

FIG. 8 is a cross-sectional view of the chemical mixing reacting chamber 32. The structure of the reacting chamber 32 provides a thorough mixing of the two chemicals once they are delivered to the chamber 32. In particular, the chamber comprises an outer housing 112, an inner housing 114 that is open at one end 116 and a central portion 118 having a plurality of ports 120, and all of which are concentrically positioned. The high pressure input flow 122 of chemical (in alternation, as explained above) from the manifold 46 enters the central portion 118 through an opening 124 and then exits the central portion 118 via the plurality of ports 120 into the inner housing 114, where chemical from the last piston stroke is present, and mixing occurs. The mixed flow 126 then exits the inner housing 114 through the opening 116 in the inner housing 114 into the outer housing 112. The mixed flow 126 continues around the outside of the inner housing 114 and then out of the reacting chamber 32 through a passageway 128 to form a treated water flow output 131 i that passes by the conductivity probe 40 and then out into the main riser 10. Thus, the various direction changes encountered by the overall flow as it progresses from the input flow 122 to the output flow 131 provides for a thorough mixing of the two chemicals delivered thereto. The structure of the reacting chamber 32 provides for even-flow mixing and avoids oscillatory or bounce-style mixing which can inadvertently deliver concentrated chemicals into the fire sprinkler system.

The flow switch 34 (e.g., a Watts Industries, Inc. FS-10C flow switch) detects the input flow from the make up water supply and thereby energizes the conductivity controller 30. In particular, electrical power (110VAC) from conventional available outlets (115VAC, 7 Amp), is provided to the apparatus 20 via a power cord 130 (FIG. 1) that is electrically coupled to the flow switch 34. When a paddle (not shown) in the flow switch 34 detects the inrush of make up water supply flow, the flow switch 34 closes, thereby delivering electrical power to the conductivity controller 30. As the fire sprinkler system fills up and the input flow stops, the paddle no longer experiences any flow force and the switch 34 opens, thereby cutting off power to the conductivity controller 30. In addition, the flow switch 34 includes a momentary override switch 134 (normally off) that permits the operator to power up the pump 38 when the water is not flowing, as long as the switch 134 is held down. In particular, this permits the operator to power up the conductivity controller 30 and to prime the pump 38 in order to set the controller 30 and to set the chemical feed rates prior to putting the apparatus 20 on line.

The conductivity probe 40 can be implemented using the AH-1B electrode (1 inch NPT) also manufactured by Advantage Controls, Inc., which is rated for 300 psi and 4–20 mA output.

The backflow preventor 28 is a double check valve that can be implemented using a Watts Industries, Inc. (of North Andover, Mass.) Series 007 double check valve assembly (Watts 007M2QT size 1¼"). The backflow preventor 28 prevents any reverse flow of water from making its way back into the make up water supply 12. The throttle valve 36 is supplied with the backflow preventor 28. The maximum pressure for the backflow preventor 28 is approximately 175 psi. The throttle valve 36 allows the operator to modify the input flow if the makeup water supply is at too high a pressure for apparatus 20 operation.

At the input, a sample drain valve 135 (e.g., ¼") is coupled to the throttle valve 36 and allows the apparatus 20 to be drained; another drain valve 137, located at the output, is also provided for facilitating drainage of the apparatus 20. Among other things, these drains are important for relieving the high pressure present in the apparatus 20 once the fire sprinkler system is filled. To de-couple the apparatus 20 from the fire sprinkler system, the pressure is relieved by opening (1) the air bleed valve 33, (2) the sample drain valve 135 drain valve; and (3) the drain valve 137 next to probe 40. Once the pressure is relieved, the operator can disconnect the hoses.

The input hose 23 that connects the apparatus 20 to the main water supply source 12 comprises a high pressure-treated inlet supply hose (e.g., 10'×1¼" supply hose, although longer hoses can be used) that is coupled to the input fitting 42 (FIG. 1) at one end and is coupled to the make up water supply port valve 35 at its other end. Similarly, the output hose 25 connects the apparatus 20 to the main riser 10 of the fire sprinkler system also comprises a high pressure-treated inlet supply hose (e.g., 10'×1¼" supply hose) that is coupled to the outlet fitting 44(FIG. 1) at one end and is coupled to the main riser port valve 37 at its other end. For connecting the input hose 23 to the make up water supply port valve 35, it is preferable to include a connector on the input hose 23 that is a dripless quick connect fitting consisting of a female end attached to the hose and a male end 1¼" NPT which should be installed on the fire sprinkler system; furthermore, it is preferable to have a shutoff valve between the fire sprinkler pipe and the dripless fitting.

The injectors 51A/51B can be implemented using SS injection nozzles #26 series supplied by Advantage Controls, Inc.

Return valves 139A and 139B are also coupled between the pump 38 output and respective return lines 141A and 141B for returning chemicals to their respective containers 26A and 26B. In general, this configuration permits the pump 38 to be primed and also the pump 38 to be flushed after use. In particular, in order to prime the pump 38, the operator closes the system feed valves 50A/50B. Next, the operator then opens the return valves 139A/139B and then depresses the momentary switch 134. As a result, respective chemical is sucked into the pump 38 and then any unused chemical is returned to the respective container via the return valve/return line path. Once completed, the operator then closes the return valves 139A/139B and then opens the system feed valves 50A/50B in preparation for normal apparatus 20 operation. Similarly, once the fire sprinkler system is treated and the apparatus 20 disconnected, the operator can flush the pump 38 by removing the containers 26A/26B and installing a pail (not shown) containing water. The operator repeats the procedure for priming the pump 38; however, instead of sucking chemical into the pump 38, flushing water is circulated through the pump 38 and back into the pail.

To protect the apparatus 20 from over-pressure conditions, a pair of pressure relief valves 143A and 143B are coupled between the pump 38 output and the return lines of the containers 26A/26B (FIG. 2). As mentioned earlier, most make up water supply sources 12 operate in the range of 90–175 psi. However, should the make up water supply source 12 exceed approximately 175 psi, these pressure relief valves 139A/139B open up to protect the apparatus 20. These pressure relief valves 139A/139B can be implemented using stainless steel relief valves "#36" and "#18" (not to be confused with reference numbers: 36A-back flow preventor, or 36B-throttle valve, nor inspector's test valve 18) also supplied by Advantage Controls, Inc.

It should be understood that the apparatus 20 is not limited to the use of the biocide and corrosion inhibitor chemicals (e.g., manufactured by Surtech Corp. of Indianapolis, Ind.) and that other chemicals (e.g., bromine, chlorine, etc.) could be used in this apparatus 20 without detracting from the scope of the invention.

It should be understood that the single motor/dual piston pump 38 is by way of example only. It is within the broadest scope of the invention to include other ways known in the art of delivering a metered amount of chemical to the manifold without mixing the chemicals before reaching the mixing chamber 32. For example, the single motor/dual piston pump 38 could be replaced with two dedicated pumps which are independently energized by the conductivity controller 30 in timed relation such that while one respective pump is delivering a predetermined amount of chemical, the other pump is de-energized (or stationary) and vice versa. Another example is to branch the manifold 46 into two sub-manifolds whose ends form the entrance to the central portion 118 of the mixing chamber 32. A respective feedline 48A and 48B is then coupled to a respective sub-manifold; a dedicated pump can then be used in each feedline 48A/48B and the end result is that there is no mixing of the two chemicals until they reach the mixing chamber 32.

It should be further understood that the apparatus 20 can be used to feed a single chemical into a fire sprinkler system. For example, if the operator desires to only feed bromine into the fire sprinkler system, he/she need only to adjust the threaded member 106B of the piston for the chemical feed path 48B (or the other threaded member for the piston controlling feed path 48A) not being used to a zero piston stroke; other than that, the operation procedure is similar to that discussed above. Alternatively, if a dedicated pump is used in each feed path 48A/48B, the unused path pumped need only be de-energized; other than that, the operation procedure is similar to that discussed above. Thus, it is within the broadest scope of this invention to include the feeding of only one chemical into a fire sprinkler system using the apparatus 20.

Thus, from the above description, it should be understood that the apparatus 20 can sense, measure and control any liquid product in a moving stream and wherein this control is based upon the delta electrical potential in that stream with its relationship to that individual flow.

Without further elaboration, the foregoing will so fully illustrate my invention that others may, by applying current or future knowledge, readily adopt the same for use under various conditions of service.

I claim:

1. A fire sprinkler treatment apparatus for automatically treating the water of a fire sprinkler system with at least one chemical, said apparatus being adapted to be coupled between the fire sprinkler system and a water source that supplies the fire sprinkler system with water, said apparatus comprising a portable frame that permits said apparatus to be transported and wherein said apparatus automatically treats the water of the fire sprinkler system with at least one chemical based on the measured conductivity of the water.

2. The apparatus of claim 1 wherein said apparatus further comprises:
   hoses for coupling said apparatus to the fire sprinkler system and to the water source;
   a container of a water treatment chemical;
   at least one manifold for supporting a flow of water therethrough from the water source;
   a pump coupled to said container for supplying a predetermined amount of chemical to said flow of water;
   a mixing chamber coupled to said at least one manifold that provides a treated water flow output;
   a conductivity probe for detecting the conductivity of said treated water flow output; and
   a controller coupled to said conductivity probe, said controller energizing said pump based on said detected conductivity.

3. The apparatus of claim 2 wherein said controller comprises means for storing a setpoint.

4. The apparatus of claim 3 wherein said controller comprises means for comparing said detected conductivity to said setpoint, said comparing means energizing said pump whenever said detected conductivity is less than said setpoint.

5. The apparatus of claim 3 wherein said controller comprises means for storing a water source conductivity value.

6. The apparatus of claim 2 further comprising a flow switch, said flow switch energizing said controller whenever a flow of water from the water source is detected.

7. The apparatus of claim 6 wherein said flow switch comprises an override switch, said override switch permitting an operator to energize said controller in the absence of said flow of water from the water source.

8. The apparatus of claim 1 wherein said apparatus further comprises:
   hoses for coupling said apparatus to the fire sprinkler system and to the water source;
   a first container of a first water treatment chemical and a second container of a second water treatment chemical;
   at least one manifold for supporting a flow of water therethrough from the water source;
   at least one pump coupled to said containers for supplying a predetermined amount of respective chemical to said flow of water;
   a mixing chamber coupled to said at least one manifold that mixes said predetermined amount of respective chemicals together and provides a treated water flow output;
   a conductivity probe for detecting the conductivity of said treated water flow output; and
   a controller coupled to said conductivity probe, said controller energizing said pump based on said detected conductivity.

9. The apparatus of claim 8 wherein said at least one pump supplies a predetermined amount of respective chemical to said flow of water in alternation.

10. The apparatus of claim 9 wherein said controller comprises means for storing a setpoint.

11. The apparatus of claim 10 wherein said controller comprises means for comparing said detected conductivity to said setpoint, said comparing means energizing said pumps whenever said detected conductivity is less than said setpoint.

12. The apparatus of claim 9 wherein said pump comprises:

a pair of pistons that are reciprocable in a respective cylinder, each of said respective cylinders being in fluid communication with a respective container;

a motor, coupled to said comparing means, that rotates a shaft when energized;

a pair of bearings each having a respective center point and a respective outer surface and wherein said shaft is coupled to each of said bearings at a respective location that is offset from each of said respective center points; and wherein each of said pistons is driven by said outer surface of said respective bearing when it rotates.

13. The apparatus of claim 12 wherein said respective locations are selected such that when said shaft rotates each of said bearings generates a respective eccentric motion and wherein said respective eccentric motions are 180° out of phase with each other.

14. The apparatus of claim 13 wherein said pump further comprises a respective bracket for each of said pistons, said bracket comprising a first slidable end, a second slidable end formed by a respective piston and a connecting member that connects said first slidable end to said respective piston, said first slidable end and said piston being driven in alternation by said respective outer surface of said respective bearing when said respective bearing rotates to cause said piston to reciprocate.

15. The apparatus of claim 14 wherein said first slidable end is adjustable for modifying the stroke of said piston, said stroke of said piston determining the amount of said respective chemical supplied to said flow of water.

16. The apparatus of claim 15 wherein one of said first slidable ends can be adjusted to a zero piston stroke such that said respective chemical is not fed into said water flow, said pump thereby feeding only the other one of said respective chemicals.

17. The apparatus of claim 12 further comprising:

a respective feed valve coupled between said respective cylinder and said manifold;

a respective return line coupled between said respective cylinder and said respective container;

a respective return valve in series with said return line; and wherein said respective return line and return valve permit the return of chemical from a respective container whenever said respective feed valve is closed and said pump is energized during priming of said pump or flushing of said pump.

18. The apparatus of claim 9 wherein said first water treatment chemical is a biocide.

19. The apparatus of claim 18 wherein said second water treatment chemical is a corrosion inhibitor.

20. The apparatus of claim 8 further comprising a flow switch, said flow switch energizing said controller whenever a flow of water from the water source is detected.

21. The apparatus of claim 20 wherein said flow switch comprises an override switch, said override switch permitting an operator to energize said controller in the absence of said flow of water from the water source.

22. The apparatus of claim 8 wherein said mixing chamber comprises a plurality of concentric housings.

23. The apparatus of claim 22 wherein said plurality of concentric housings comprises:

a first housing having a plurality of ports, said first housing receiving said flow of water having a predetermined amount of respective chemical therein;

a second housing having an opening, said first housing being positioned inside of said second housing; and a third housing including a passageway for directing said treated water flow output, said second housing being positioned inside of said third housing.

* * * * *